Oct. 19, 1943.  P. SHAFFER  2,332,173
DISH
Filed Feb. 26, 1941
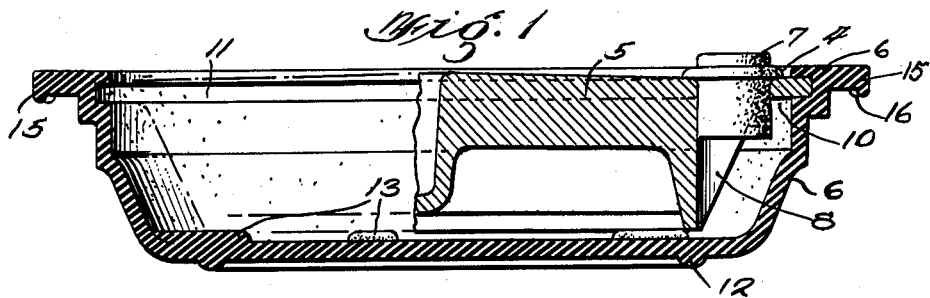
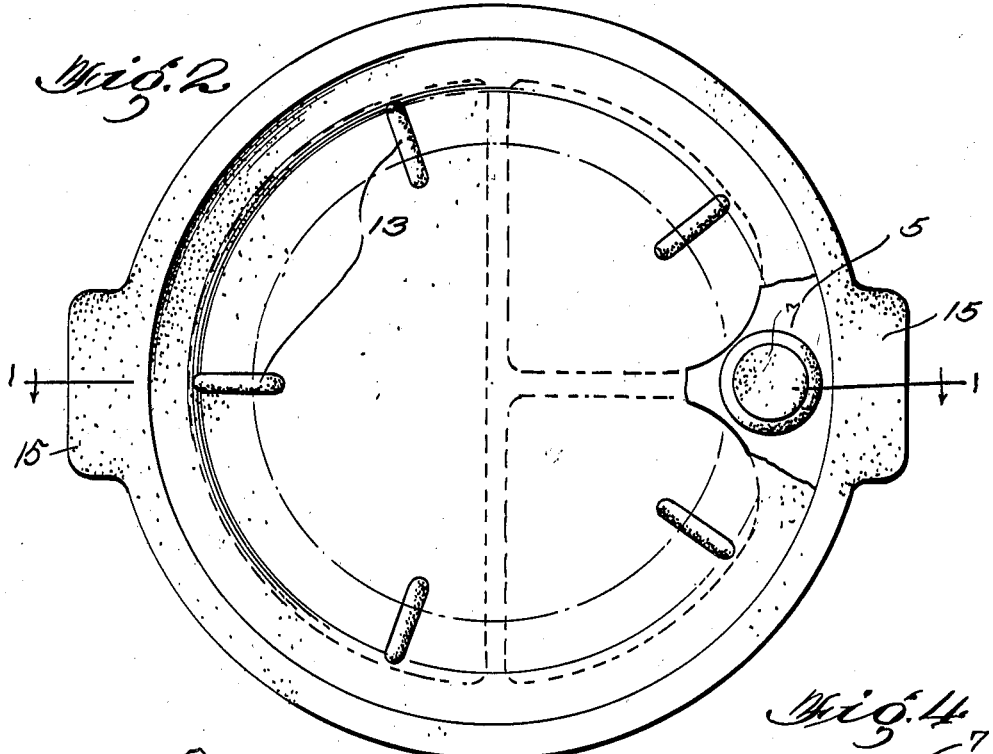
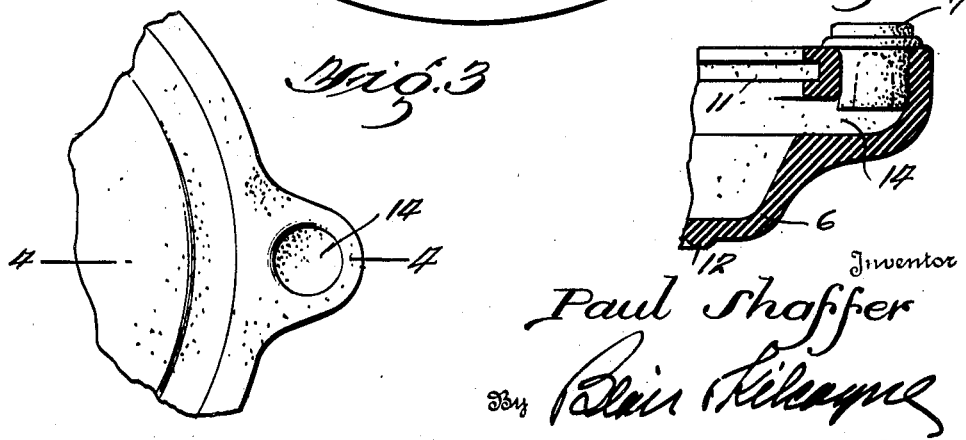
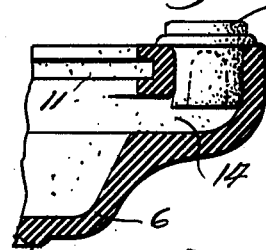
Inventor
Paul Shaffer
By Blair Kilcoyne
Attorneys Patented Oct. 19, 1943

2,332,173

UNITED STATES PATENT OFFICE 2,332,173

DISH

Paul Shaffer, Akron, Ohio

Application February 26, 1941, Serial No. 380,707

8 Claims. (Cl. 65—15).

This invention relates to dishes or plates and more particularly to that type adapted to keep food in a dish at a desired temperature. The invention is directed to dishes especially useful when feeding small children who are prone to eat so slowly that their food becomes cold and therefore distasteful and possibly injurious to their sensitive stomachs.

Accordingly one of the main objects is to provide a practical dish which will retain the heating medium at a heated temperature for long periods and thereby present a means to keep food warm in this dish. The invention will be described with relation to such use although modifications as to size and use are within its scope.

Another object is to provide a dish of the above general character, which may be kept completely sanitary by means of an easily removable liquid carrying member.

Another object is to provide an inexpensive dish which will hold a predetermined temperature, by means of a liquid carrying member, without leakage.

A further object of this invention is to provide a device of the above general description in which the liquid carrying member insures better insulation, reduces breakage through shock, and avoids the rust and corrosion that accumulates in metal dishes of this kind.

A still further object is to provide a dish as generally described above, with a rubber member for holding the temperature controlling substance that has an irregular non-skid bottom to prevent slipping on the smooth surface of a tray or table, as well as to hold the hot dish from injurious contact with such support.

Other objects will be in part obvious from the annexed drawings and in part hereinafter indicated in connection therewith by the following analysis of this invention.

This invention accordingly consists in the features of construction, combination of parts, unique relation of members, and the relative proportioning and disposition thereof, all as more completely outlined herein.

To enable others skilled in the art fully to comprehend the underlying features of this invention, that they may embody the same by the numerous modifications in structure and relation contemplated by the invention, drawings depicting two embodiments of the invention form a part of this disclosure, and in such drawings like characters of reference denote corresponding parts throughout the several views, in which—

Fig. 1 is a cross-sectional view of the assembled dish along the line 1—1 of Fig. 2;

Fig. 2 is a top plan view of the rubber cover member including a part of the dish;

Fig. 3 is a top plan view of a modification of the fluid inlet;

Fig. 4 is a cross-sectional view along the line 4—4 of Fig. 3.

Referring now to the drawing in detail, it will be noted in Fig. 1 the assembly comprises three parts: an inner dish part 5 of porcelain, china, or the like, shown here and further indicated in Fig. 2 as a conventional three-division plate, a rubber outer cover member 6, and a stopper 7. The inner dish part 5 has a small opening 8 near the outer edge into which the stopper 7 is forced so as to prevent easy removal by a child and prevent leakage. The outer cover or casing member 6 tightly grips a flange 10 of the plate 5 around its entire circumference by means of a close fitting and leak-proof groove 11 formed in its inner top edge. This clinching member projects slightly above the top of the plate 5, thereby preventing the ready spilling of food from the dish. This also enables one to grip the top of the cover and remove it more easily from the dish when the dish and cover are to be washed. Thus the parts may be more easily cleaned and kept sanitary.

By making the cover of soft flexible rubber, not only is a better insulating effect obtained over the use of metal but the dish is better able to withstand shocks as might be caused if the dish is dropped or pushed off a tray as so frequently happens with small children. The rubber also has a higher coefficient of friction than metal and for this reason there is less tendency to slide on a polished surface and a greater resistance to movement on the part of a child. The outer casing of rubber may be made in various colors to suit one's fancy.

A protecting ring 12 or the like is provided on the bottom. This is especially adapted to hold the body of the casing 6 clear of a polished surface which might otherwise become marred by the heating medium within the casing.

The interior of the casing is provided with a plurality of spaced supporting means such as lugs 13 adapted to engage the bottom of the dish 5 at spaced intervals thereby to hold the dish clear of the bottom of the casing and permit the fluid within the casing to completely surround the dish and pass upwardly into the hollow partitions dividing the plate into a plurality of sections as shown in Figs. 1 and 2.

In Figs. 3 and 4 substantially the same general arrangement is shown except that instead of having the filling opening 8 in the plate, as shown in Fig. 1, a separate spout 14 is provided and formed in the rubber. This spout is closed preferably by the hollow stopper 7 just as shown in Figs. 1 and 2. This construction, however, is perhaps less desirable not only by reason of the appearance but also the difficulties and expense possibly encountered in forming the molds in which the rubber covers or casings are vulcanized.

There is preferably provided at opposite sides of the dish suitable lifting tabs, as indicated at 15, with a slight downwardly extending lip 16 which enables the dish to be more easily and safely handled, especially if one's fingers happen to be wet. Likewise, by providing these extending finger grips 15, the parts are further positioned from the heating medium and are thereby at a less and more comfortable temperature so far as handling is concerned.

While the present invention is herein illustrated and described with particular reference to dishes for use by children and the space between the dish and the cover is adapted to be filled by a heating medium such as hot water, obviously the dish with its cover may be made considerably larger in size thereby to serve as a vegetable dish. The dish under such circumstances may be free from partitions or not as desired. Also, while this invention is described with relation to the use of a heating medium, obviously ice water may be inserted through the opening if the dish is used for ice cream, salads, or the like where the colder temperature is preferred. Then again while it has been pointed out that this dish is particularly suited for feeding children, it has been found extremely useful in hospitals and sanitariums for invalids.

The method of use and operation is clear from the above statement. It may be remarked, however, that before serving the food to a child, for example, the stopper 7 is removed and hot water poured in through the opening or spout after which the stopper is firmly seated in place. The food is then distributed into the compartments as desired and the meal served to the child and kept in a warm, tasty condition, with slight danger of being pushed from the tray or marring the surface because of the heating medium used.

When it is desired to clean the plates, it is preferable, first, to remove the stopper 7 and pour out the water between the dish and its casing, after which the casing may be stretched and peeled from the flange of the plate and both the plate and cover washed thoroughly, both inside and out.

From the above it will be seen that the present invention comprehends a simple and practical dish particularly suitable for use in feeding infants. The entire assembly comprises relatively few parts which may be inexpensively manufactured and assembled with ease. The parts being so positioned, constructed and arranged, obviously allows for thorough cleaning of both the casing and cover, inside and out, thereby maintaining the parts in sanitary condition.

Without further analysis the foregoing will so fully reveal the gist of this invention that others can, by applying current knowledge, readily adapt it for various applications without omitng certain features that, from the standpoint of the prior art, fairly constitute essential characteristics of the generic or specific aspects of the invention, and therefore such adaptations should and are intended to be comprehended within the meaning and range of equivalency of the following claims.

I claim:

1. A cooperating casing or cover for a plate, of the character described having a flange at its top and a partition dividing the plate into compartments, said cover being made of soft flexible rubber and having an annular recess at its top to receive said flange, and spacing lugs on the interior bottom to support said plate, means for admitting fluid to the interior of said casing whereby fluid may completely surround the plate, and supporting means on the exterior bottom of said casing.

2. A dish of the character described comprising, in combination, a plate having a relatively wide flange, a partition dividing the plate into compartments, an opening through the flange, in line with the end of said partition, a closure of soft rubber for said opening, and a cooperating cover for said plate, said cover being made of soft flexible rubber and having an annular recess at its top to receive said flange, and spacing lugs on the interior bottom to support said plate, whereby fluid may completely surround the plate.

3. A liquid carrying member particularly adapted for use with a dish or plate of the character described and having a relatively wide flange, said member being made of relatively soft rubber or the like having an annular recess about its upper periphery adapted to receive the flange of the plate in fluid-tight relation, said member having a spout formed therein through which fluid may be admitted to the interior of the member, thereby to maintain the temperature of the plate substantially constant, as desired.

4. A liquid carrying member of the character set forth in claim 3, in which said spout is provided with a closure element of relatively soft flexible material having a liquid-tight fit with said spout.

5. A cooperating liquid carrying member for a dish or plate of the character described having a relatively wide flange, said member being made of soft flexible rubber-like material and having a circumferential recess substantially rectangular in cross section at its top to receive a correspondingly shaped flange of the dish, and spacing lugs on the interior bottom of the member to support the plate, whereby fluid may completely surround the lower part of the plate.

6. A cooperating casing or cover for a plate of the character described having a relatively wide angular flange at the top and a partition dividing the plate into compartments, said cover being made of soft flexible rubber-like material having a circumferential recess substantially rectangular in cross section at its top to receive the flange of the dish, lifting tabs on said cover, means on the interior bottom of said casing to support said plate whereby fluid may completely surround the plate, and a protecting ring on the exterior bottom of said cover.

7. A dish of the character described comprising, in combination, a plate having a relatively wide flange substantially rectangular in cross section, a hollow partition dividing the plate into compartments, an opening through the flange, in line with said partition, a closure of soft rubber for said opening, and a cooperating cover of soft flexible rubber-like material for said plate, and having a recess at its top to receive the similarly shaped flange, lifting means on said cover, spacing means on the interior bottom of said cover to support said plate whereby fluid may completely surround and circulate about the plate, and a protecting ring on the exterior bottom of said cover to hold the body of the cover out of contact with a supporting surface.

8. A feeding dish of the character described having a casing of flexible, elastic, heat-insulating material formed with spaced upwardly extending supporting means in the interior bottom thereof for engaging the underside of the dish to permit circulation of fluid therein, the base of said casing comprising an exterior protecting ring, said casing having a wall extending upwardly and provided with a recess at its top substantially rectangular in cross section, said dish having a similarly shaped projected peripheral flange engaging said recess whereby the parts are held against accidental separation, said casing providing a container for fluid about said dish and having a filling opening and closure near its outer edge.

PAUL SHAFFER.